United States Patent [19]

Drosdak

[11] Patent Number: 4,864,767
[45] Date of Patent: Sep. 12, 1989

[54] FISHING LINE JAW-TYPE CONNECTOR

[76] Inventor: Joseph Drosdak, 158 W. Coal St., Nesquehoning, Pa. 18240

[21] Appl. No.: 292,894

[22] Filed: Jan. 3, 1989

[51] Int. Cl.4 .......................................... A01K 95/00
[52] U.S. Cl. .................... 43/43.1; 43/44.83; 43/44.89
[58] Field of Search ................ 43/43.1, 43.12, 44.83, 43/44.84, 44.85, 44.87, 44.9, 44.91, 44.92, 44.89

[56] References Cited

U.S. PATENT DOCUMENTS

| | | | |
|---|---|---|---|
| 2,533,418 | 12/1950 | Benoit | 43/44 |
| 2,712,196 | 7/1954 | Allen | 43/43.1 |
| 2,904,924 | 8/1957 | Tashiro | 43/44.89 |
| 2,983,068 | 11/1959 | Grayson | 43/44.89 |
| 3,125,790 | 6/1961 | Gaylord | 43/43.12 |
| 3,293,792 | 11/1964 | Bittaker | 43/44.89 |
| 3,641,699 | 3/1972 | Mattarocci | 43/44.89 |
| 3,722,130 | 3/1973 | Handl | 43/44 |
| 4,369,551 | 1/1983 | Heredia | 43/43.1 |

Primary Examiner—Richard K. Seidel
Assistant Examiner—Michael William Starkweather
Attorney, Agent, or Firm—Steele, Gould & Fried

[57] ABSTRACT

A fly line connector comprising an elongated or cigar-shaped body having a loop connector at one end portion and a jaw means at the other end portion. The jaw means grips the fishing line and a locking means locks and jaw means over the fishing line.

13 Claims, 1 Drawing Sheet

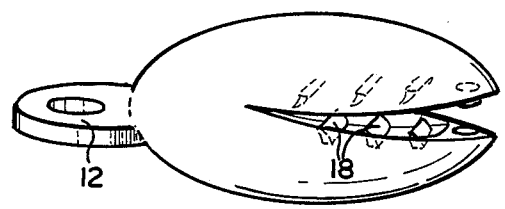
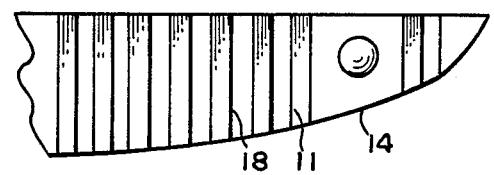
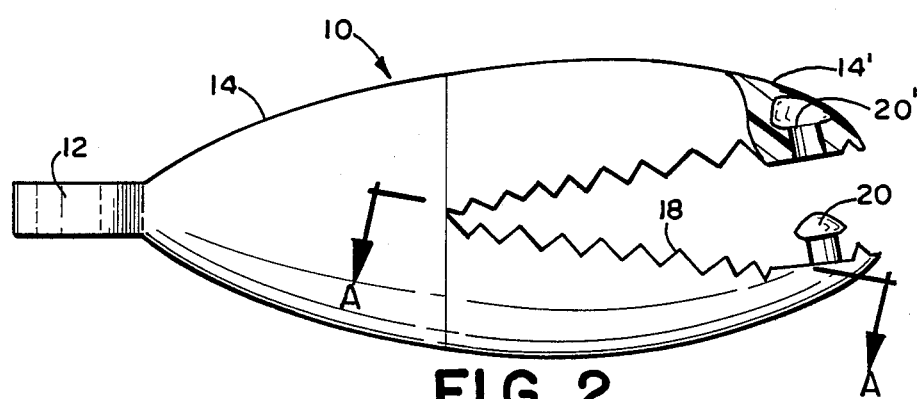
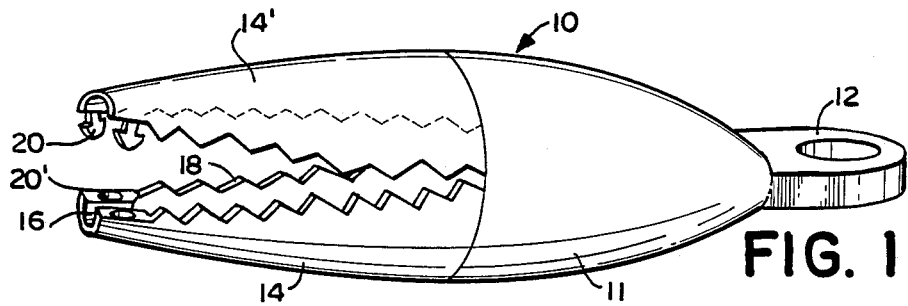
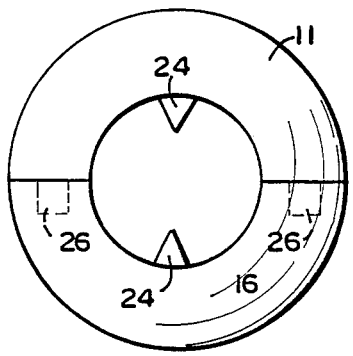
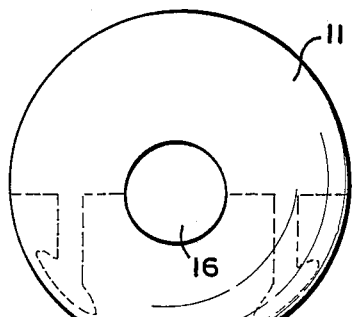
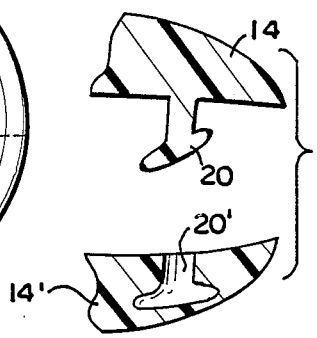

FISHING LINE JAW-TYPE CONNECTOR

BACKGROUND OF THE INVENTION

1. Field of the Invention

The present invention relates to a fly line connector. More particularly, the invention is concerned with a connector for fly lines which can permit a fisherman to easily and quickly change leaders without tying knots, and to a method of making such a connector.

2. Description of the Prior Art

The fly lines which are at present recognized as giving best results are those formed of a tubular braiding of synthetic fibers, covered on the outside by a plastic film, thus producing a structure of high strength and with a degree of flexibility in accord with the purpose which said line is to serve. These lines, the size of which varies between 0.5 and 2 mm in diameter, consist of two types—one of uniform diameter commonly known as parallel lines and the other, of appreciable higher price than the foregoing, whose diameter decreases towards the free end, which feature has resulted in the name of rat-tail by which it is known among fishing enthusiasts.

Since the cost of the braided rat-tail tubular line is considerably higher than that of the parallel line, in general the fisherman is not financially able to purchase it despite the advantages which it offers, for which reason, he purchases different sections of parallel line of different diameters and connects them in such a manner as to obtain a line having a behavior similar to that of the costly rat-tail.

On the other hand, both those who use the parallel fly line and those who use the original rat-tail or rat-tail constructed in the manner indicated above, find it frequently necessary to repair their cut lines by splices. For this purpose, it should be pointed out that up to now the work involved in making a splice of a synthetic tubular line constitutes a task which must be carried out slowly and with a great deal of patience, it being impossible to effect it at the fishing site itself since the connection of the broken line is effected by a splice which is then covered with several layers of varnish, each of which must be allowed to dry properly. Therefore, up to the present time, the fisherman whose line is cut sees his fun ruined. Unless he has a spare line, he must bring the line in for repair or else splice it himself; but he can never do this at the fishing site itself for the reasons mentioned above.

U.S. Pat. No. 2,533,418 to Benoit relates to snells or leaders made of various materials and which are usually attached to the shank of a fishhook by wrapping with a thread. An adhesive is placed on the wrapping to secure the parts together.

U.S. Pat. No. 3,722 to Handl discloses a connection for tubular fishing lines which comprises a pin with barbs at its ends.

It is a primary object of the invention to provide a connector for use in connection with fly lines which can simplify the problem of attaching or changing leaders.

It is another object of the invention to provide a method for rapidly changing leaders of a fly line without knots.

It is a still further object to provide fishing line connectors which can be utilized with all types of lines.

It is yet still further object of the invention to provide a fishing line connector which can also act as a strike indicator.

SUMMARY OF THE DISCLOSURE

In accordance with the invention there is provided a fishing line connector comprising an elongated or cigar-shaped body having a loop connector at one end portion. The other end portion of the line connector comprises a jaw means for gripping a fishing line and means for locking the fishing line within the jaw means.

Advantageously, one or both jaws are slotted to permit insertion of the line into the connector. The jaws may be toothed or barbed to provide resistance against removal of the line. The greatest resistance is obtained when the teeth of the jaw means are inclined toward the rear portion of the connector. The teeth may be throughout the jaws, outside of the slot, or only within the slot.

The locking means may comprise locking pins, for example those with male and female connectors, screw means, clamp means or the like to maintain the jaw means securely about the fly line.

To provide a more permanent locking of the jaw means, a water insoluble adhesive may be utilized within the jaw means or completely encapsulate the jaw means. The adhesive may be any of the quick drying adhesives such as epoxy resins, acrylic resins, acrylic urethane ester resins and the like. Commercially available super glue adhesives such as sold under the trademark ZAP-GAP have been found to be particularly of use with the invention.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWING(S)

FIG. 1 is a perspective view of the connector of the invention;

FIG. 2 is a side view, partially in section of the connector of FIG. 1;

FIG. 2A is a cross-section on line A—A of FIG. 2;

FIG. 3 is a side view of the connector;

FIG. 4 is a front view of the connector in a locked position.

FIG. 5 is a side elevation in section of one form of locking means of the connector; and, FIG. 6 is a front view of another form of connector of the invention.

DETAILED DESCRIPTION OF THE PREFERRED EMBODIMENT(S)

Although specific terms are used in the following description for the sake of clarity, these terms are intended to refer only to the particular structure of the invention selected for illustration in the drawings, and are not intended to define or limit the scope of the invention.

As shown in FIGS. 1-3, the fly line connector 10 of the invention comprises an elongated body 11 having an eyelet or loop 12 provided at one end. The eyelet 12 may be screwed into the body or held within the body by suitable adhesive means or molded therein. The eyelet 12 preferably comprises a metallic substance but may be formed integral with the body 11.

The body 11 advantageously comprises a thermoplastic or thermosetting resin having good strength and buoyancy in water. The resin may be a fluoroplastic, acrylic resin, polyamide, polyarylsulfone, polyester, or the like.

At the side opposite the eyelet 12 is formed a pair of jaws 14, 14' having a slot 16 formed in at least one of the jaws 14, 14' to receive a fly line. On the jaws are provided protrusions or teeth 18 which are intended to grip the fishing line or merely close tightly depending on the size of the line. Advantageously, the teeth 18 are angularly inclined toward the rear portion so as to provide the greatest resistance.

A locking means 20, 20' is provided so as to continuously press the jaws 14, 14' on the fishing line which is inserted therein. The locking means 20, 20' can comprise mating male 20 and female 20' locking pins as shown.

To maintain a permanent hold of the jaws on a line it is preferable to cover at least the jaws with a quick setting adhesive. However, a clamping means may be utilized in place of the adhesive means.

As shown in FIG. 4, the jaws 14, 14' when closed may hold the fly line without any resistance means in the slot 16. The use of a strong adhesive is usually sufficient when inserting the fly line into the slot 16 and is sufficient for use in connection with the size and resistance of the fish found in fly fishing.

As shown in FIG. 5, the means for locking together the jaws 14, 14' may comprise a male protrusion 20 which is locked into a mating slot 20' for permanent closure. The locking means may be formed during molding of the body 11. However, the protrusion 20 may comprise a metal pin or screw which is either molded into body 11 or inserted after forming.

In FIG. 6, there is shown teeth 24 which are found in the slot 16. The teeth 24 may comprise metal pins or serrations which bite into a fly line to provide additional resistance to removal of the fly line. The pins may be molded into the jaws 14, 14' or may be inserted through the jaws so as to protrude within the slot 16.

FIG. 6 also shows locking means 26 which is formed by mere protrusions that are adhesively bonded in an associated slot.

The connection of the invention can be molded in a resilient, break resistant, buoyant engineering plastic material. Preferably, the connector is about ¾" long, with ½" being 3/16" in diameter and the remaining ¼" being a metal eyelet having an inside diameter of about 1/16". The connector is preferably cylindrical in shape with one solid tapering end and open sides to form opposing jaws. A section on the opposite end forms a split ring or open eyelet. The latter section preferably has a locator and locking mechanism integrally molded into it. An adhesive may be employed in assuring that the ring is secured in a closed position. Preferably, the interior of the jaws is radiused to match the diameter of the fly line and has multiple serrations which form teeth to bite into and grip the inner and outer layers of the line. The serrations are angled against the direction of applied force for maximum efficiency. In operation, the line can be inserted easily in through the locking ring when in an unsecured state. The end of the line can be cut square and then pushed into the open end of the connector. When it is seated against the end of the connector, the jaws are then closed and secured. The eyelet is metallic and formed in 18 gauge wire. It has an inside diameter of 1/16".

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A fishing line connector comprising an elongated body having a loop connector at the rear end portion, the front end portion of said body comprising jaw means for gripping a fishing line, and locking means associated with each jaw that upon engagement holds said fishing line within said jaws.

2. The connector according to claim 1 wherein said jaw means is toothed.

3. The connector according to claim 2 wherein said teeth are inclined toward said rear end.

4. The connector according to claim 1 wherein said jaw means is slotted so as to receive said fishing line.

5. The connector according to claim 2 wherein a slot is on one side of said jaw means.

6. The connector according to claim 4 wherein said slot comprises protrusions for holding said fishing line.

7. The connector according to claim 1 wherein said locking means comprises locking pins.

8. The connector according to claim 1 wherein said locking means comprises a screw means.

9. The connector according to claim 1 including adhesive means for supporting said jaw means in a closed position about said fishing line.

10. The connector according to claim 1 which comprises a synthetic resin.

11. The connector according to claim 1 which is colored so as to act as a strike indicator.

12. The connector according to claim 1 wherein said elongated body is cigar-shaped.

13. A method for attaching a leader to a fishing line comprising the steps of providing an elongated body having a loop connector at the rear end portion and jaw means at the front end portion;
   clamping a fishing line into said jaw means;
   locking said jaw means onto said line;
   attaching said leader to said loop connector; and
   applying a water insoluble adhesive onto said jaw means to adhesively prevent opening of said jaw means and to adhesively secure said line within said jaw means.

* * * * *